TELEVISION ECHO SUPPRESSION SYSTEM

Filed March 22, 1945 7 Sheets-Sheet 1

INVENTORS
FRANK J. BINGLEY
NEWLAND F. SMITH, JR.
BY
Ostrolenk and Faber
ATTORNEYS INVENTORS
FRANK J. BINGLEY
NEWLAND F. SMITH, JR.
BY
Ostrolenk and Faber
ATTORNEYS INVENTORS
FRANK J. BINGLEY
NEWLAND F. SMITH, JR.
BY
Ostrolenk and Faber
ATTORNEYS

TELEVISION ECHO SUPPRESSION SYSTEM

Filed March 22, 1945 7 Sheets-Sheet 4

INVENTORS
FRANK J. BINGLEY
NEWLAND F. SMITH, JR.
BY
Ostrolenk and Faber
ATTORNEYS Feb. 21, 1950 F. J. BINGLEY ET AL 2,498,391

TELEVISION ECHO SUPPRESSION SYSTEM

Filed March 22, 1945 7 Sheets-Sheet 5

INVENTORS
FRANK J. BINGLEY
NEWLAND F. SMITH, JR.
BY
Ostrolenk and Faber
ATTORNEYS

TELEVISION ECHO SUPPRESSION SYSTEM

Filed March 22, 1945 7 Sheets-Sheet 6

INVENTORS
FRANK J. BINGLEY
NEWLAND F. SMITH, JR.
BY Ostrolenk and Faber
ATTORNEYS Feb. 21, 1950 F. J. BINGLEY ET AL 2,498,391

TELEVISION ECHO SUPPRESSION SYSTEM

Filed March 22, 1945 7 Sheets-Sheet 7

INVENTORS
FRANK J. BINGLEY
NEWLAND F. SMITH, JR.
BY Ostrolenk and Faber
ATTORNEYS Patented Feb. 21, 1950 2,498,391

UNITED STATES PATENT OFFICE 2,498,391

TELEVISION ECHO SUPPRESSION SYSTEM

Frank J. Bingley, Philadelphia, and Newland F. Smith, Jr., Abington, Pa., assignors, by mesne assignments, to Philco Corporation, Philadelphia, Pa., a corporation of Pennsylvania Application March 22, 1945, Serial No. 584,112

5 Claims. (Cl. 178—7.2)

This invention relates to picture transmission systems and the like, and to a method and means for controlling the action of the residual echoes after suitable provision has been made for the elimination of the major part of the echo effect upon the received or reconstituted picture.

More particularly, the invention relates to television systems and to a method of controlling the behavior of the residual pattern which remains after certain means for the rejection of echo signals have been employed. In particular, it is applied to a method of eliminating the undesirable progression of echo residual patterns resulting from a double reception of the synchronizing pulses caused by the fact that radio waves travel over two paths from the transmitter to the receiver when a reflecting structure is near the receiver.

One of the problems which occurs in television transmission is that which arises from long delayed echoes which occur when radio waves arrive at the receiver over two different paths; one path of which is the direct path and the other path of which is a path involving reflection from an object, as for example a cliff or a gas holder, which is off to one side of the direct path by a considerable distance. Such multiple paths may produce echoes delayed by 15 or 20 microseconds. In magnitude these echoes may be relatively faint, but since the blanking and particularly the synchronizing signals are of considerably greater amplitude than the line or picture portion of the television signals, echoes of the reflected blanking and synchronizing signals are sometimes of considerable strength and appear in the picture as a result of these long delayed echoes.

The forms which such echoes may take are clearly shown in a pending application of Bingley and Bradley, Serial No. 433,660, filed March 6, 1942, now Patent No. 2,386,087, issued October 2, 1945. In that specification, it is shown that an echo signal causes either a dark or a light spot upon the picture as received, and also that a series of vertical lines alternately dark and light are obtained when echoes of the synchronizing pulses are received using the system of alternate carrier frequency for the synchronizing pulses as described in Patent No. 2,347,248.

In the co-pending application referred to, it is shown that when the effect of an acho is normally black, it can be changed to white by reversing, in an alternate sequence, the polarity of the carrier of the synchronizing and blanking signals. This polarity reversing may be done in any one of a number of ways, but it appears to be preferable to reverse these polarities for every successive synchronizing pulse throughout one field. This produces echo signals which if examined from the top to the bottom of the picture screen appear as a series of dark and light spots.

In order to produce neutralizing of this echo effect, it has been proposed that the corresponding field in the succeeding frame should have the polarities of the echo signals just reversed from those which obtained in the first frame. Since these frames occur at a rate of 30 per second, it was expected that the eye would average out the alternate dark and light spots so as to neutralize the echo effect. Thus the eye seeing alternately light and dark spots would average the light intensity, and the screen at the position of the spot would appear to have the light intensity that was supposed to be present without the echo, so that apparently there would be no echo in the picture.

It was found, however, that with this type of switching of the phases, there was an apparent vertical optical progression across the screen of a series of dots. Under some circumstances this series of dots appears to move upward, and under other circumstances, this series of dots appears to move downward. This effect, while considerably less objectionable than the original echo effect which it was desired to overcome was nevertheless somewhat troublesome, and it is the purpose of this invention to control the motion of these dots.

In accordance with our invention the actual reversal of polarity is accomplished by circuits, such as those described in the application referred to above. The particular features of this invention are the means by which keying signals are supplied to these polarity reversing circuits in order to obtain certain specified sequences of polarity in the synchronizing pulses transmitted by the television transmitter.

Accordingly a primary object of this invention is to provide means for obtaining a certain sequence or sequences of polarity reversals of the synchronizing pulses in a television transmitter.

Other objects and advantages of the invention will be apparent from the following description and the accompanying drawings in which.

Figure 1:
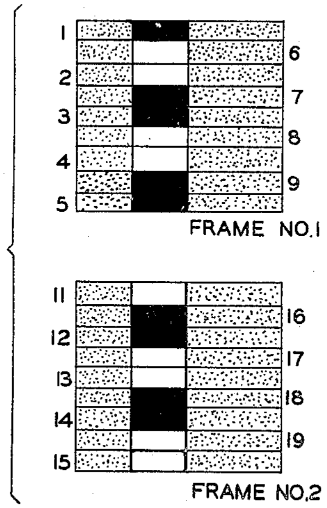
Figure 1 shows two successive frames of the television screen with the received echoes shown symbolically.

The present invention can be best understood by first referring to Figure 1. In this figure there is shown two successive frames of the picture on the television screen. This picture has been simplified in two respects. First of all, the actual television picture itself has been eliminated from the diagram, the normal screen appearing merely as a shaded or dotted region. Another simplification has been made in that the number of scanning lines has been reduced to 9 instead of the customary 525. This has been done merely for the purpose of making the description of the invention more clear, since the same theory which will be described hereafter will hold for any number of scanning lines arranged as this sequence of scanning lines is arranged.

In scanning each frame, there are two fields, the first of these constitutes scanning lines 1, 2, 3, 4 and 5. The second field constitutes lines 6, 7, 8 and 9. It will be observed that the first sequence of scanning lines is interlaced between the second sequence of scanning lines. In the frame numbered 2, the same sequence of scanning lines is carried out, the lines now being numbered from 11 to 19. The effect of the echo of the synchronizing and blanking pulses are shown in these figures. In one phase the echo is shown to give a black signal; in the opposite phase it is shown as giving a white signal. These, of course, may be in any difference of gradation since in vector terms the phases, although they are diametrically opposed 180°, may be at any random angle to the actual picture signal carrier.

In the diagram the worst case has been shown, in which the echo signal is first fully in phase with the picture signal and then fully out of phase with the picture signal. As the picture is scanned on scanning line #1, the echo gives a response of one polarity. On scanning line #2, the echo gives a response of the other polarity, since the phase of the echo is now the opposite to the phase which existed when line 1 was being scanned. Likewise, in scanning line 3, the polarity of the echo has been reversed to the polarity given with line 1. This process is continued through the end of the first field.

In the system shown in this figure, the same sequence is continued to line 6, line 6 giving a "white" echo when line 5 gave a "black" echo. This alternate sequence is continued down to line 9, and line 11, which follows line 9, gives a white signal in contrast to a black signal from line 9.

Figure 2:
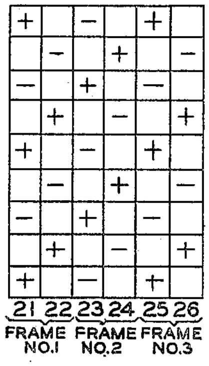
Figure 2 shows a diagrammatic development of the echo images shown in Figure 1.

This sequence of echo polarity is shown in Figure 2. Here the vertical column of squares above #21 is the column of echoes produced in the scanning of the first field of frame #1. The vertical column of squares above 22 is the pattern of echoes produced in scanning the second field of frame #1, and so in sequence across the diagram from left to right.

Thus in scanning field 21, the polarity of the echoes could be described as being positive, negative, positive, negative, positive, reading from top to bottom of the column—that is, from top to bottom of the screen itself. It is to be observed that every other square is left blank because the scanning process for the first field of frame #1 omits every other scanning position.

Field #2 of frame #1 fills in these omitted scanning positions, and thus it is observed that the polarity marks in the second field of frame #1, that is, field 22, do not appear in the same horizontal position that do the polarity marks for field 21. Field 23 occupies the same scanning position as does field 21 and likewise does field 25. Moreover field 24 and field 26 occupy the same scanning position that field 22 occupies.

If then, the polarity of the echoes is consistently reversed, minus, plus, minus, plus, minus, etc. progressively from field to field, a pattern is secured of plus and minus marks in the polarity diagram for the echoes corresponding to the arrangement shown in Figure 2. The special feature of this form of diagram arises from the fact that it is now easy to see whether or not there is any apparent motion of the echo pattern upon the screen. This particular diagram shows that the apparent motion of the echo pattern will be upwards. This is shown by the fact as one moves his vision from left to right across the diagram, the polarity marks rise through the diagram. This then gives an effect upon the television screen of an upward motion of the bright and dark spots of the echo pattern.

Figure 3:
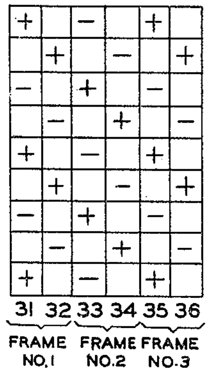
Figure 3 shows a symbolic development of another form of echo reception caused by another sequence of polarity reversals.

Psychologically, it appears that this upward motion of the echo pattern is more objectionable than would be a downward motion of the echo pattern. Such a downward motion would appear in an echo sequence diagram as is shown in Figure 3. Here it is observed that the polarity marks progress downward as one goes from field to field across from left to right so the apparent motion of the echoes is downward. In studying the sequence of these echo polarities, it is observed that although through each field the echo polarities automatically reverse from plus to minus to plus to minus, etc., when the transition is made from one field to the next field, the polarity is maintained the same at the beginning of the second field as it was at the end of the first field. Thus the first polarity mark, that is, the top one in field 32 is positive, and likewise the last polarity marks in field 31, that is, the bottom one, is also positive. Thus as one goes from field 31 to field 32 one must also reverse the reversal of polarity marks. It is to be observed that this reversal of reversals again occurs between frame 32 and 33; likewise between frame 33 and 34 and so on across the whole picture pattern.

Figure 4:
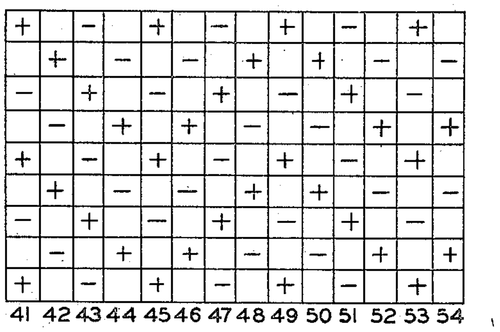
Figure 4 shows still another method of echo progression.

It is a purpose of the invention to show a method for accomplishing this type of reversal. It is, of course, possible by various combinations of the pattern of Figure 2 and the pattern of Figure 3, to accomplish a succession of motions up and down of the echo pattern on the screen. Such a succession is shown in Figure 4 in which there are four downward motions, then four upward motions, then four downward motions, etc.

Figures 5, 6, 7:
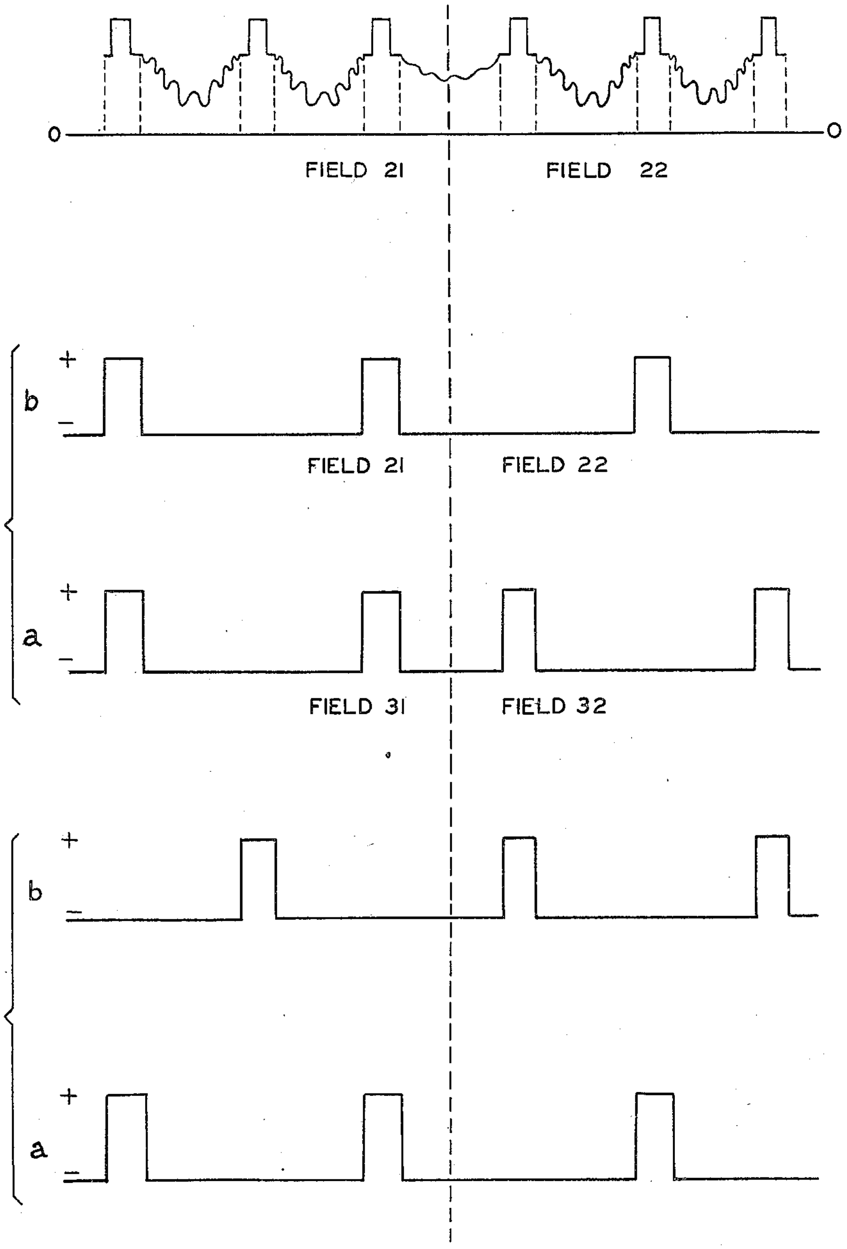
Figure 5 shows a video signal with synchronizing pulses.
Figure 6 shows two successions of pulses for producing the patterns of Figures 2 and 3 respectively.
Figure 7 shows two series of pulses used to form the series of Figure 6.

The manner by which the synchronizing pulses change polarity in the manner shown in Figures 2 and 3 can also be demonstrated with the aid of Figure 5. This is intended to correlate with the diagram of Figure 2, the practice preceding the present invention, and shows the end of field 21 and the beginning of field 22. Here the lowest or last positive polarity in field 21 is shown and the first or negative polarity in field 22 is also shown. The upper part of this diagram of Figure 5 shows the variation in transmitted signals showing the blanking pulses, the synchronizing signals, and the video parts of the signal. In this diagram time is represented as moving from left to right. The polarity diagram of Figure 6*b* beneath this transmitted signal diagram indicated is so arranged that it indicates positive and negative polarity of the transmitted carrier signal.

In accordance with the previously mentioned application, the polarity is changed during the blanking and synchronizing pulses for every other pulse giving them a positive polarity for every other synchronizing pulse and a negative polarity for the remaining intermediate synchronizing pulses. This provides the echo pattern as is shown in Figures 1 and 2.

In order to achieve the sequence of echoes as shown in Figure 3, it becomes necessary to have a polarity sequence such as shown in Figure 6*a*. This polarity sequence is in time register with the video signals shown in Figure 5. It will be observed from Figure 3 that in changing from field 31 to field 32 there are two successive positive polarities involved.

It is a necessary part of this invention that arrangements be made for accomplishing this purpose. One such arrangement can be obtained through the use of a pair of polarity signals, such as are shown in Figures 7*a* to 7*b*. It will be recognized that 7*a* is the same signal used in Figure 6*b* for polarity reversals, and that the signal in Figure 7*b* is complementary to that shown in 7*a*. The keying signals shown in Figure 6*a* can be obtained from the signals *a* and *b* of Figure 7 by using signal *a* for field 31 and signal *b* for field 32. This then requires switching from signal *a* to signal *b* at the time that the fields change from 31 to 32. Likewise, at the time that field 32 changes to field 33, it is necessary that the keying signals be switched back to signal *a*. At the time that field 33 changes to field 34, the switch must be made again so that polarity sequence *b* is used. This change, it will now be noted, occurs every time that one field changes into the next field.

Figure 8:
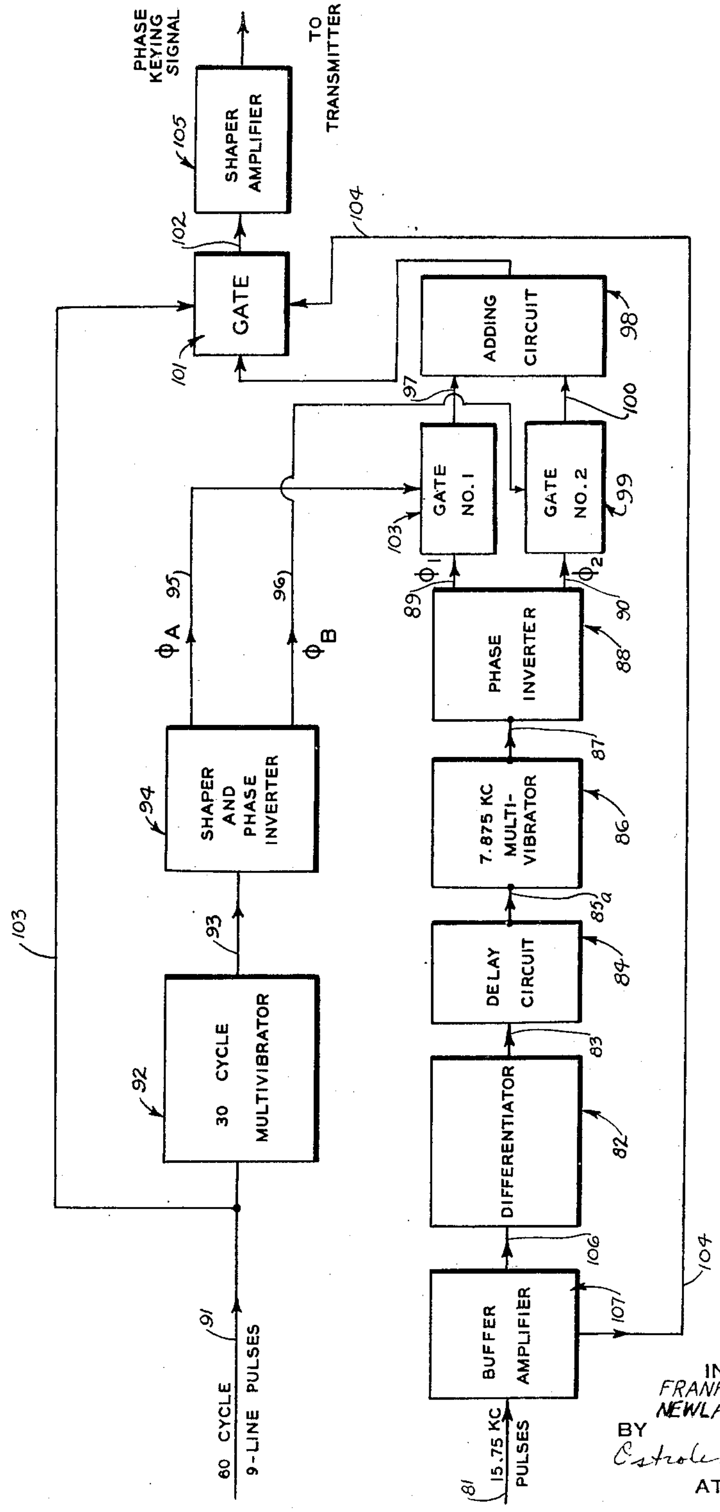
Figure 8 shows a block diagram of a system for producing the synchronizing pulses required in Figure 6*a* to produce Figure 3.

A block diagram for a system of accomplishing the desired result is shown in Figure 8. Horizontal blanking pulses at 15.75 kc. are fed in over line 81 and through a buffer amplifier 107 and line 106 to a differentiator circuit 82. This differentiator circuit is so arranged that its output, which provides a sharp pulse occurring at the lagging edge of the input pulse coming over line 81, is fed over line 83 to the delay circuit. This pulse is inserted into the delay circuit 84 and the output of the delay circuit on line 85*a* is a pulse delayed slightly from the pulse which comes in on line 83. Thus the pulse on line 85*a* is delayed after the pulse entering on line 81. The pulse on line 85*a* is fed into a multivibrator operating at approximately a frequency of 7.875 kc. which is half the frequency of the input pulse system.

The signal on line 85 synchronizes the multivibrator 86 so it is maintained at exactly half of the frequency of the input pulses. The output of the multivibrator 86 is fed over line 87 to a phase inverter 88. This phase inverter produces two series of square waves—phase 1 on line 89 and phase 2 on line 90. These two phases are in opposition to each other, and are fed into individual gate circuits 103 and 99, respectively.

The vertical synchronizing signal is brought in over line 91 and constitutes pulses at 60 cycles, each pulse lasting for 9 horizontal line periods in the illustration here shown. This input signal is fed into a multivibrator 92 which operates at 30 cycles per second. The output of this multivibrator on line 93 is in the form of approximately square waves at 30 cycles. This output is fed into the shaper and phase inverter 94. Out of this shaper and phase inverter two phases of 30 cycle square waves are obtained—one on line 95 and another on line 96.

The phase A on line 95 is supplied to gate #1 and when the signal present on line 95 is of the proper polarity, gate #1 is operative and phase 1 is put out of gate #1 through line 97 into the adding circuit 98. When the voltage on line 95 is of the opposite polarity, the voltage on line 96 is proper to open gate #2 indicated at 99, so that the signal on line 90 is now presented to the adding circuit 98 through line 100.

The adding circuit 98 takes the output of gate #1 and gate #2, adds them, and feeds them to gate 101. This gate is controlled from the 60 cycle 9 line pulses so that this horizontal signal is turned off during the time that the vertical synchronizing signal is being applied. The output of gate 101 is fed over line 102 through the shaper amplifier 105 to the transmitter.

This output then consists of a series of pulses occurring a double line apart, except during the vertical synchronizing pulses when they are blanked out. These are shifted in timing by a single horizontal line at each change of field. This is the signal illustrated in Figure 6*a*.

If it is desired to operate this system without shifting the pulse sequence each field, this can be done by biasing off gate #2 the phase inverter 88 and the phase inverter 94 in such a manner that lines 89 and line 95 are continuously energized. Under these circumstances gate #2 is not operative so the signal coming through gate 101 remains always the same. That is, a succession of pulses occurring at a frequency of 7.875 kc. Each one of these pulses then would be used to shift to invert the phase of the carrier during the time of transmission of the horizontal blanking pulse.

In the gate 101 the complete sequence of 15.75 kc. pulses is controlled by the output of the adding circuit 98. Thus the output of the gate 102 is composed of the sequence of pulses desired, as is shown in Figure 6. These signals are actually part of the signals injected into the input of the system and thus have no phase shift in them.

Figure 12:
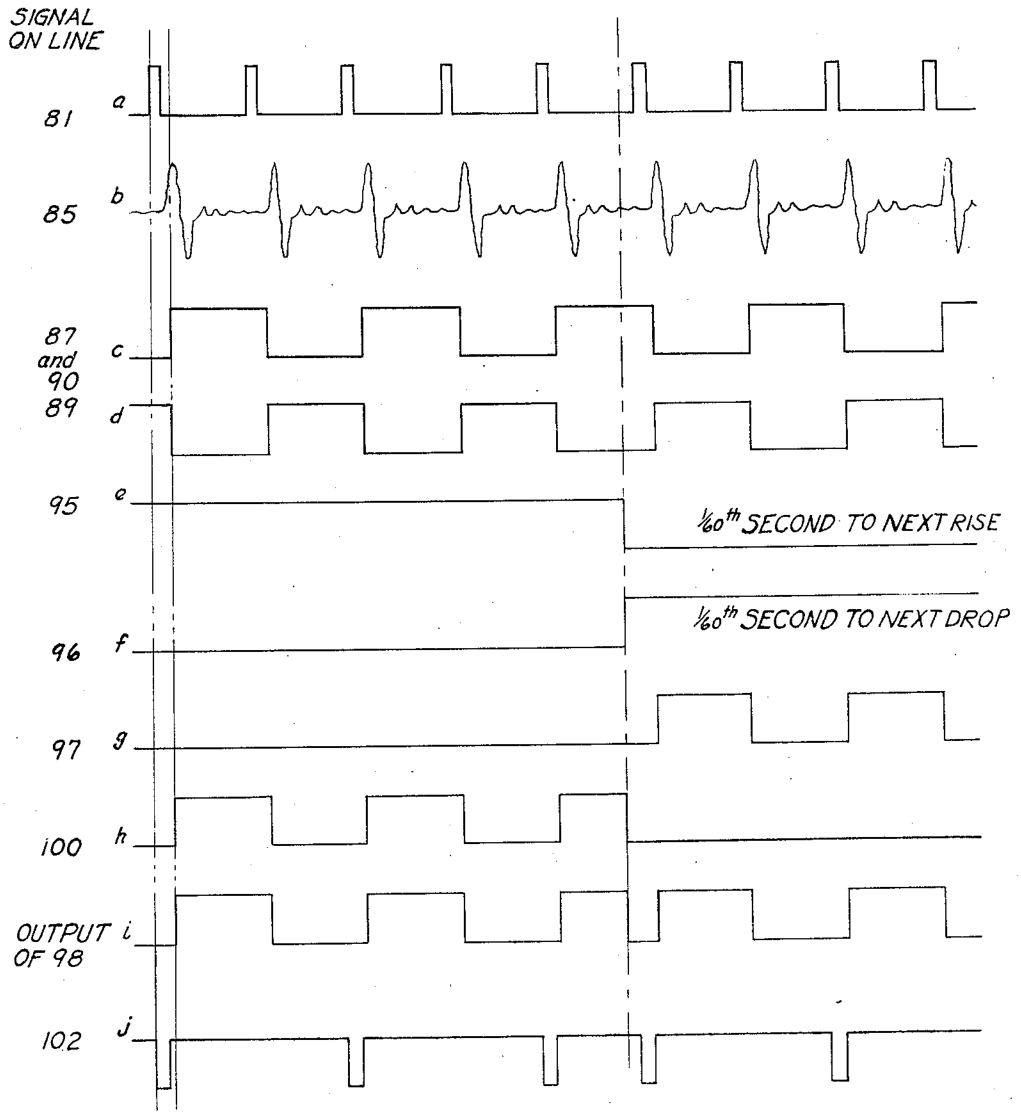
Figure 12 shows the relative impulses on the various lines and their time relation.

In Figure 12 I have illustrated the relative time relations of the signals. Referring to this figure and summarizing the operation of the keying signal generator, the signals on line 81 of Figure 8 consist of a series of pulses at a frequency of 15.75 kc. as shown in this sheet of wave forms at *a*. These pulses are sent through the buffer amplifier and differentiator and delay circuit of Figure 8. The output of the differentiator consists of a series of pulses occurring at the beginning and end of the input pulses. Only the pulses at the end are used in the delay circuit.

These pulses generate a series of transients in the output of the delay circuit. These are shown as line *b* in Figure 12 and occur at the same frequency of 15.75 kc. That is, this is the repetition frequency of these transients.

It is to be observed that these transients are occurring in the time interval provided for the signal shown in *a* for the video signals. These transients are used to synchronize the 7.875 kc. multivibrator. The output of this multivibrator is substantially a square wave output with a freqency of 7.875 kc. Its wave shape appears in line *c* of Figure 12. This signal is passed through the phase inverter which provides two different signals as output signals. One of these is just like the phase inverter input signal and appears on line 90 in Figure 8 and its wave form is shown as *c* in Figure 12. The other output signal of this phase inverter appears on line 89 and is shown as *d* in Figure 12.

It is to be observed that the vertical portion of these square waves occur during the quiescent period of the signal input shown as *a*. Thus, there is no possibility that the subsequent operations caused by these two square waves *c* and *d* will interfere with the original pulses put into the system.

The 30 cycle multivibrator 92 of Figure 8 generates square waves at a frequency of 30 cycles. The output of this multivibrator is likewise fed into a shaper and phase inverter 94, the output of which appears as two signals, one on line 95 and one on line 96.

In Figure 12 it is only possible to show the change-over period of this signal since the period is so long. The signal shown as *e* in Figure 12 is the signal on line 95 and the signal shown as *f* is the signal on line 96. The signal *e* is used in gate #1 to key in signal *d*, thus providing the signal shown as *g*. This signal appears on line 97.

The operation of gate #1 then is essentially as follows: when the signal on line 95 is positive, gate #1 is closed, and there is no output. When the signal on line 95 drops to a lower value, gate #1 opens and the signal on line 89 is transmitted to line 97.

A similar action occurs in gate #2 in which the signal on line 96, that is, the signal *f* in Figure 12, controls the passage or non-passage of the signal on line 90 shown as *c* in Figure 12.

The resultant output of gate #2 appearing on line 100 is then wave shape *h* in Figure 12. It is to be observed that wave shape *h* contains the 7.875 kc. multivibrator output until the change-over of signals *e* and *f* and after this change-over the signal appears on the output of gate #1, voltage *g*.

Furthermore at this change-over time the phase is reversed because the signal at *h* originally came from the signal *c* and the signal on *g* originally came from signal *d* which is opposite in phase to signal *c*. These two signals being fed into the adding circuit give the output signal *i* which is simply the addition of signals *g* and *h*.

This signal *i* is the signal which controls the gate 101. When this signal voltage is negative, the gate is open and when this signal is positive, the gate is closed. This gate operates on the original 15.75 kc. pulse series coming over line 104 and serves to admit pulses in accordance with the resultant keying signal *i*. Thus the output of this gate on line 102 consists of a series of pulses shown as line *j* in Figure 12 which corresponds to the desired series of pulses shown as in Figure 6*a*, except for the polarity which is inverted in the shaper amplifier 105.

The manner in which this signal is obtained can be seen by correlating wave shape *i* with wave shape *a*. When *i* is negative, the pulse in *a* appears in *j*. When *i* is positive, the pulse in *a* does not appear in *j* because the gate 101 is closed. Since *i* has a 7.875 kc. frequency, it blanks out every other pulse in the wave shape *a*.

Figure 9:
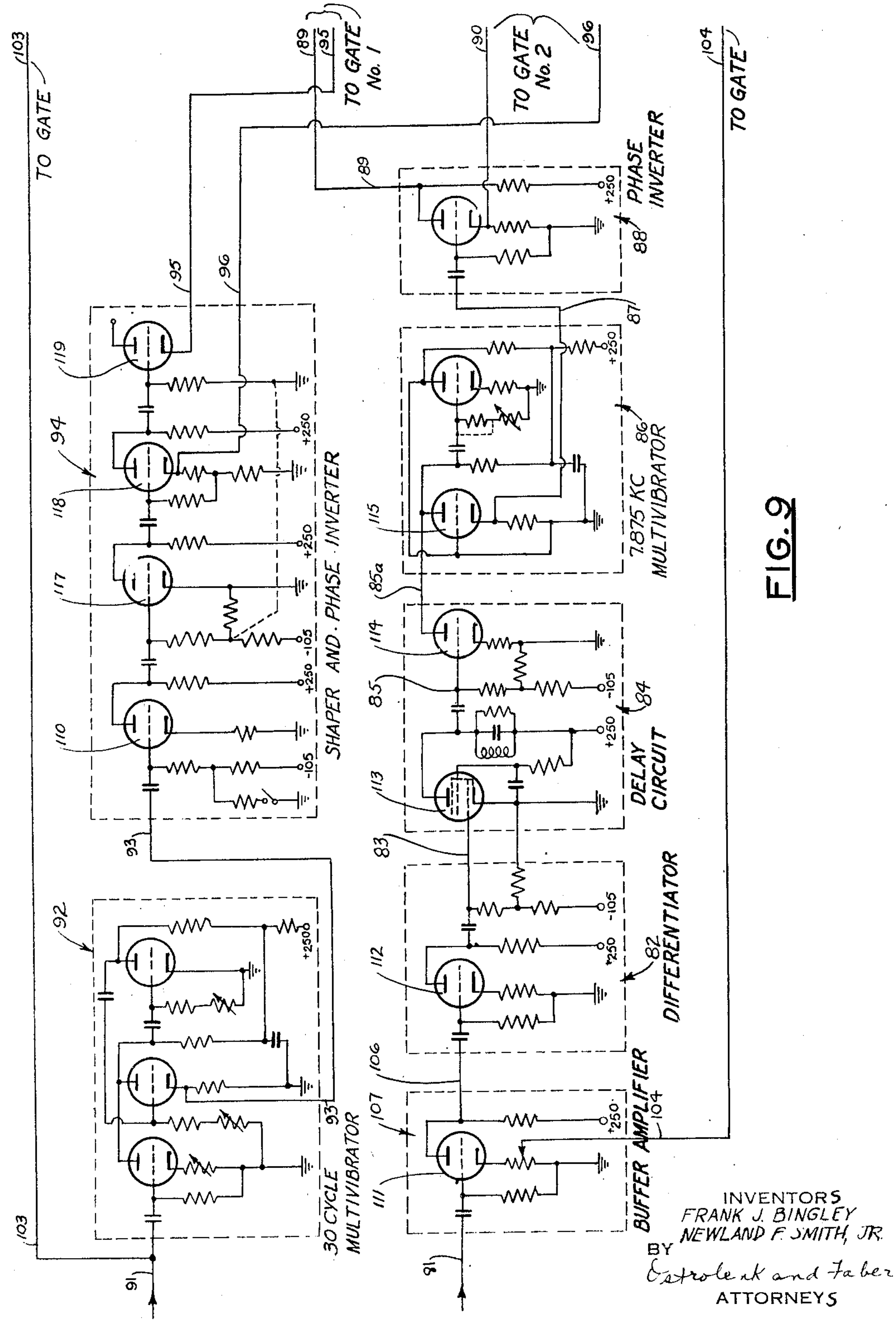
Figures 9 and 10 show a schematic diagram developing the details of the blocks shown in Figure 8.
Figure 10:
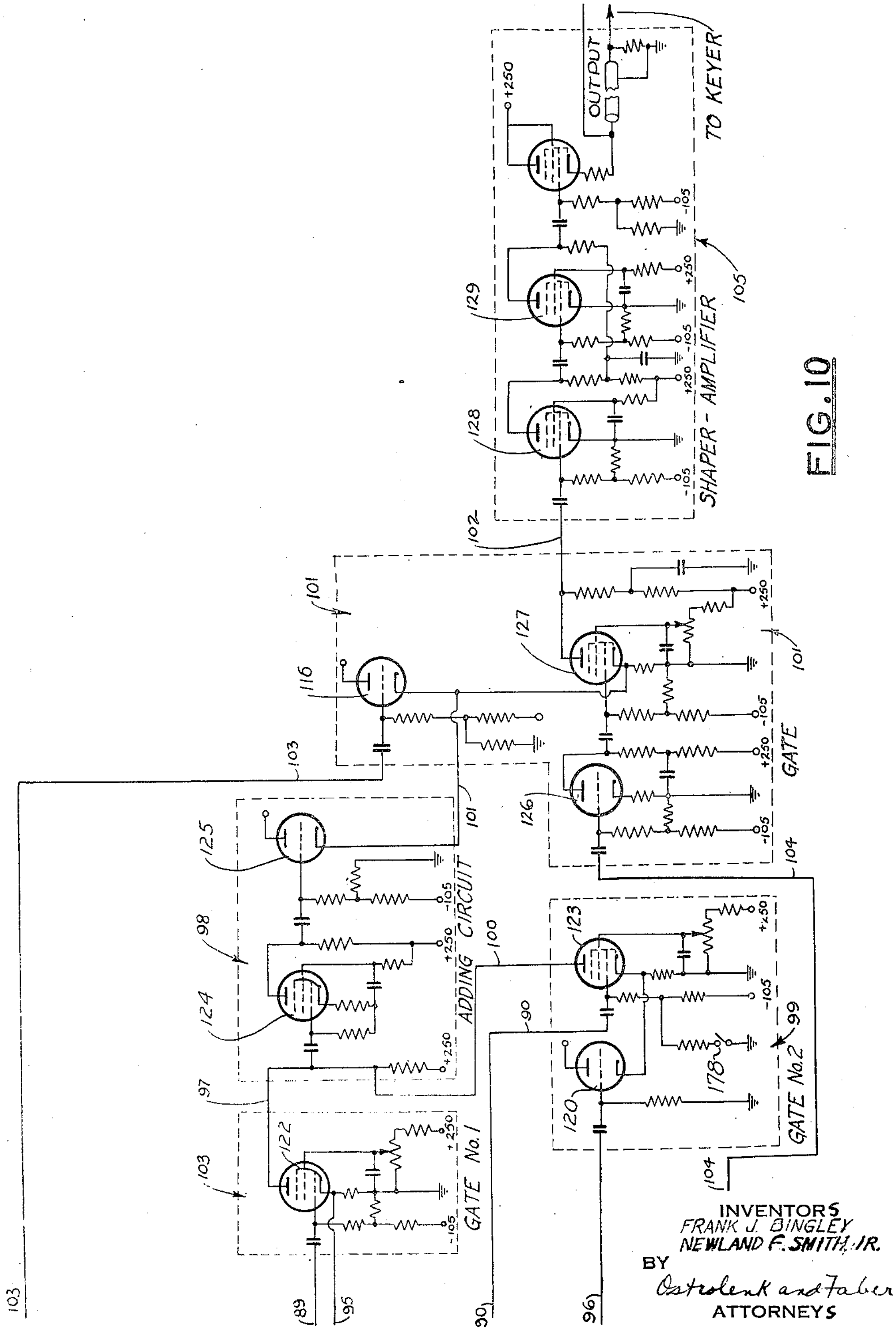

A circuit diagram for accomplishing these operations is shown in Figures 9 and 10. The parts of this diagram which correspond to the blocks on the block diagram are indicated by dotted lines which enclose parts of the actual circuit diagram. These lines are labeled with the same numbers that occurred in Figure 8 showing the relationship between the blocks in Figure 8 and the actual circuit diagram.

This circuit takes the 15.75 kc. horizontal blanking pulses in tube 111, further amplifies this in tube 112, and by differentiating the pulses a wave front is derived from the trailing edge of the pulse which is used to impulse the transient delay circuit in the plate of tube 113. The 7.875 kc. multivibrator, tube 115, is therefore fired by this delayed wave form. This 7.875 kc. pulse is shaped up in tube 121 and two polarities obtained, one from the plate circuit and one from the cathode circuit, called on the diagram $\phi 1$ and $\phi 2$. A 30 cycle wave form is generated in the multivibrator, tube 109, by dividing down the 60 cycle pulse input from the synchronizing generator. This 30 cycle square wave is applied through tubes 110, 117, 118 and 119 to alternately switch on and off tubes 122 and 123. This is accomplished by the common cathode resistors between tubes 120 and 123, and also between tubes 119 and 122. Tubes 122 and 123 have impressed upon their grids phase one ($\phi 1$) and phase two ($\phi 2$), respectively, of the 7.875 kc. pulses. In the common plate load of tubes 122 and 123, there is, therefore, for one frame this series of phase one ($\phi 1$) 7.875 kc. pulses; for the following frame the series of phase two, ($\phi 2$) 7.875 kc. pulses. These 7.875 kc. pulses are then amplified and shaped up in tube 124 and applied to the grid of tube 125. Tube 125 is used to turn tube 127 off and on at a 7.875 kc. rate. The grid of tube 127 is fed with the regular series of 15.75 kc. blanking pulses through the amplifier and inverter 126.

The output of tube 127 therefore contains a series of blanking pulses with every other one being omitted, the sequence of these being shifted every field (1/60 of a second). By opening the switches in the grid circuits of tubes 110 and 123 there could be produced a normal succession of keying pulses at 7.875 kc. without the sequence being shifted every field. This normal succession of pulses produces the "raining up" effect shown in Figure 2. Shifting the sequence every field with the 30 cycle wave form produces the "raining down" effect shown in Figure 3.

The keying operations are withheld for a period of time around the vertical synchronizing signal. This is done in tube 116 by applying the 60 cycle "nine-line" pulse to the grid of tube 116 which in turn turns off tube 127 for this period and prevents any keying pulses from appearing in the output.

The output of Figure 10 is in the form of a series of positive keying pulses.

Figure 11:
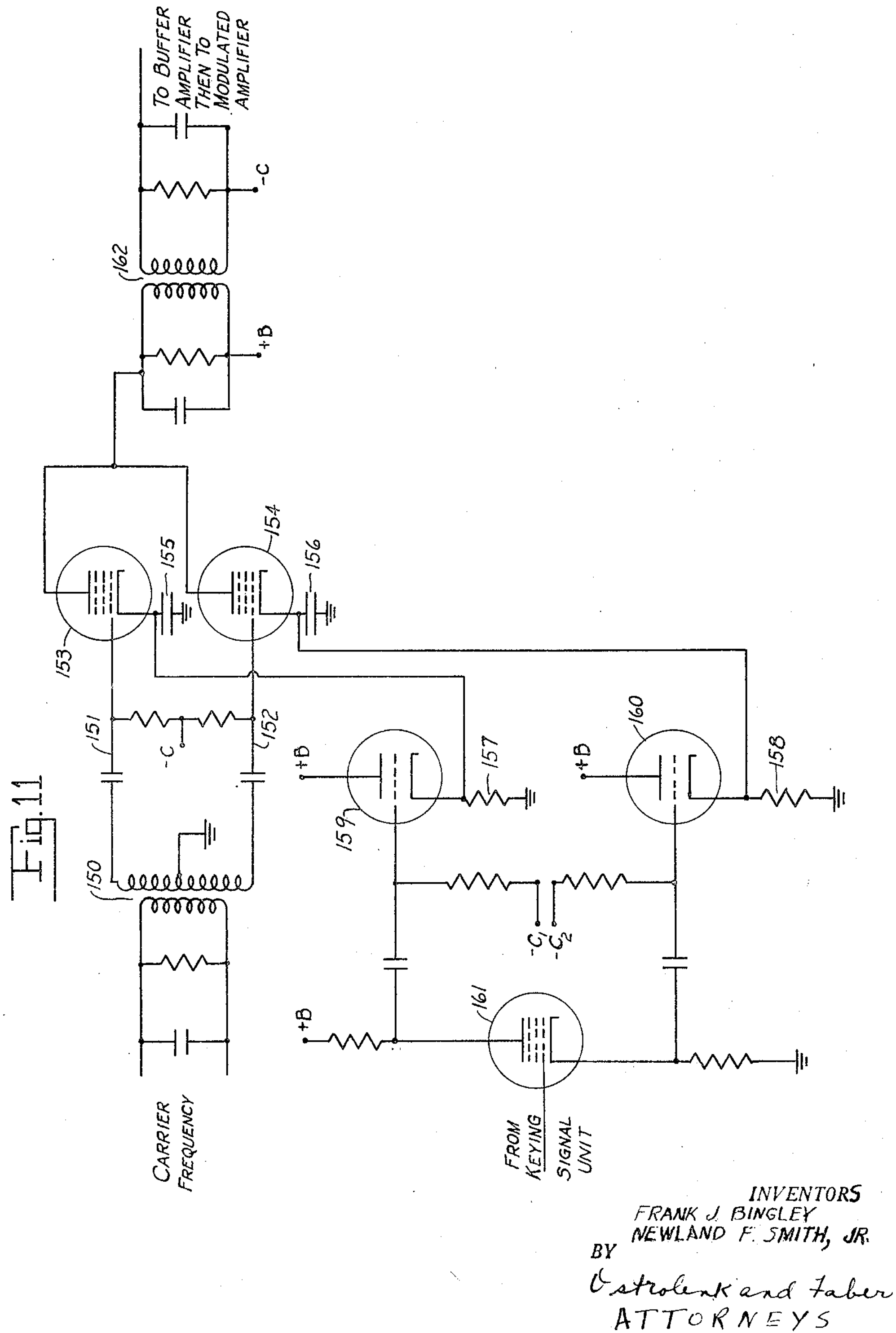
Figure 11 is a schematic of a carrier phase keyer.

In order to turn these polarities into actual changes in phase of the carrier frequency, a circuit such as that of Figure 11 may be employed. The carrier frequency is fed into the radio frequency transformer 150. The output of this transformer is in two phases, since the center tap of the secondary of the transformer is grounded. Thus the phase on line 151 is 180° out of phase with the signal on line 152. This transformer then acts as a source of two different phases of carrier frequencies, these two phases being 180° out of phase with respect to each other. These two signals are fed into the grids of tubes 153 and 154.

The cathodes of these tubes are by-passed to ground for carrier frequency by their respective condensers 155 and 156. Condenser 155 is shunted by resistor 157 and likewise condenser 156 is shunted by resistor 158. These resistors also form the cathode resistors of a pair of keying tubes 159 and 160.

These keying tubes are fed from a phase inverter amplifier tube 161 which receives its input from the keying signal generator which has been described in connection with Figure 8 and specifically from the keying signal generator of Figures 9 and 10.

Consider now that the input to the tube 161 is low in potential—that is, in the waiting period between pulses. Under these circumstances, tube 161 is non-conducting. Consequently the grid of tube 159 is high in potential and the grid of 160 is low in potential. Since tube 159 conducts, a large bias voltage is developed across resistor 157. This large bias voltage effectively cuts off tube 153 which then acts as an open circuit. Tube 160, however, is cut off by the low potential on its grid. Consequently the only current through bias resistor 158 comes from tube 154 and this current develops the correct amount of bias voltage to cause tube 154 to act as an amplifying tube.

The input to this tube is the carrier frequency signal on line 152. The output from this tube goes to the radio frequency transformer 162 and is then fed to the buffer amplifier and finally to the modulated amplifier in the transmitting systems. This modulated amplifier is the amplifier which receives the video modulation signal which is to be transmitted by the television transmitter.

Now consider what happens when a positive pulse from the keying signal generator comes into tube 161. Under this circumstance, this tube will conduct and consequently the grid of tube 159 falls in potential and the grid of 160 rises in potential. These changes are of a sufficient magnitude to cause tube 159 to become cutoff and to cause tube 160 to conduct. Conduction in tube 160 sets up enough voltage across resistor 158 to cut off tube 154. In a similar manner lack of conduction in tube 159 causes a relatively small bias to be generated across resistor 157. This is just the bias caused by cathode current in tube 153 which then acts as an amplifying tube. Its input is the signal on line 151, and its output is again given to radio frequency transformer 162 and is passed on to the buffer amplifier and finally to the amplifier which is modulated with the video signal to be transmitted.

Thus it happens that during the time that a keying signal is received on tube 161, the carrier frequency transmitted to the modulated amplifier has its source as the phase of carrier frequency on line 151, and during all other times, the carrier frequency has its source at the opposite phase, namely that on line 152. Consequently, whenever a keying signal is received by tube 161, the signal to the buffer amplifier and modulated amplifier changes phase by 180° which is the phase difference between the signals on line 152 and 151. This occurs in spite of the fact that there is bound to be a phase lag between the line 151 and 152 and the actual modulated amplifier itself. This is not important. It is simply the change in phase of 180° all along the line that is important and this is caused by the keying signal from Figures 9 and 10 fed into tube 161. In this manner the keying signal effects the reversal of phase.

Similar block diagrams could be drawn to accomplish the sequence shown in Figure 4. Such diagram would, of course, contain more parts than the diagram of Figure 8 because the sequence is more complicated. It would be necessary to provide first the signal of Figure 6*a* continuously for a number of fields, and then to reverse the situation so that the signal of Figure 6*b* was applied for an equal number of fields. Then the reversal would have to be made back to the situation giving the signal of Figure 6*a* for the same number of fields. Such an arrangement could be made with an additional electronic switch coupled into the circuit of Figure 8 and controlled by a frequency dividing circuit which would operate from the vertical sweep synchronizing signal source of Figure 8.

While for simplicity, the system has been described in terms of an amplitude modulation system, it is equally applicable to the alternate carrier system shown, for example, in Patent No. 2,347,248.

Many such modified systems could be arranged and consequently we prefer that the invention not be limited by the descriptions of specific embodiments which we have given here, but by the following claims.

We claim:

1. In a television system, a source of carrier current, a source of horizontal synchronizing pulses, a differentiator circuit, a buffer amplifier for applying said synchronizing pulses to said differentiator circuit, a delay circuit connected to said differentiator circuit for providing sharp pulses occurring at the lagging edge of said synchronizing pulses, a multi-vibrator operating at half the frequency of said synchronizing pulses activated by said delayed sharp pulses, a phase inverter connected to said multi-vibrator for producing two series of square waves in opposition to each other, a pair of gate circuits individually energized by said series of square waves for sequentially opening said gate circuits, a source of vertical synchronizing pulses, a multivibrator energized by said vertical synchronizing pulses for producing square waves in accordance with the frequency of said square waves, a phase inverter for generating signals of two phases from said square waves having a frequency in accordance with the vertical synchronizing pulses, means for supplying said signals of two phases of the vertical synchronizing pulses individually to each of said gate circuits, the first of said phases being fed therethrough when its associated gate is operative and the other of said phases being fed through its associated gates when its gate is operative, and means for controlling the phase of said carrier current in accordance with the signals fed from said gates.

2. In a television system, a source of carrier current, a source of horizontal synchronizing signals, means for generating a pair of signals 180° out of phase with each other from said source of horizontal signals, means including circuit connections for controlling the phase of said carrier currents in accordance with said pair of phase displaced signals, said means comprising a pair of gates, each of said gates being individual to said phase displaced signals, means for rendering said gates successively operative, said last means comprising a source of vertical synchronizing signals, means for generating two signals out of phase with respect to each other from said vertical synchronizing signals, and means including circuit connections to said gates for individually applying said two last mentioned out of phase signals to said gates to render said gates operative.

3. In a television system, a source of carrier current, a source of horizontal synchronizing signals, means for generating a pair of signals 180° out of phase with each other from said source of horizontal signals, means including circuit connections for controlling the phase of said carrier currents in accordance with said pair of phase displaced signals, said means comprising a pair of gates, each of said gates being individual to said phase displaced signals, means for rendering said gates successively operative, and switching means for controlling the operation of said last mentioned means on gates so as to change the sequence of operation of said gates.

4. In a television system, a source of carrier current, a source of horizontal synchronizing signals, means for generating a pair of signals 180° out of phase with each other from said source of horizontal signals, means including circuit connections for controlling the phase of said carrier currents in accordance with said pair of phase displaced signals, said means comprising a pair of gates, each of said gates being individual to said phase displaced signals, means for rendering said gates successively operative, said last means comprising a source of vertical synchronizing signals, and switching means for controlling the operation of said last mentioned means on gates so as to change the sequence of operation of said gates.

5. In a television system, a source of carrier current, a source of horizontal synchronizing signals, means for generating a pair of signals 180° out of phase with each other from said source of horizontal signals, means including circuit connections for controlling the phase of said carrier currents in accordance with said pair of phase displaced signals, said means comprising a pair of gates, each of said gates being individual to said phase displaced signals, means for rendering said gates successively operative, said last means comprising a source of vertical synchronizing signals, means for generating two signals out of phase with respect to each other from said vertical synchronizing signals, means including circuit connections to said gates for individually applying said two last mentioned out of phase signals to said gates to render said gates operative, and switching means for controlling the operation of said last mentioned means on gates so as to change the sequence of operation of said gates.

FRANK J. BINGLEY.
NEWLAND F. SMITH, JR.

REFERENCES CITED

The following references are of record in the file of this patent:

UNITED STATES PATENTS

| Number | Name | Date |
|---|---|---|
| 1,777,016 | Potter | Sept. 30, 1930 |
| 1,964,375 | Wright et al. | June 26, 1934 |
| 2,281,891 | Terry | May 5, 1942 |
| 2,333,245 | Hansell | Nov. 2, 1943 |
| 2,347,248 | Bingley | Apr. 25, 1944 |
| 2,369,614 | Smith | Feb. 13, 1945 |
| 2,372,876 | Bingley | Apr. 3, 1945 |
| 2,386,087 | Bingley et al. | Oct. 2, 1945 |
| 2,386,088 | Bingley et al. | Oct. 2, 1945 |

OTHER REFERENCES

Television Standards and Practice, by Donald G. Fink, McGraw-Hill, 1943, pages 253 to 260.